United States Patent [19]

Sueyoshi et al.

[11] Patent Number: 4,703,450
[45] Date of Patent: Oct. 27, 1987

[54] INTERFACE DEVICE

[75] Inventors: Susumu Sueyoshi; Satoru Tokui; Keiichiro Nanba, all of Tokyo, Japan

[73] Assignee: Pioneer Electronic Corporation, Tokyo, Japan

[21] Appl. No.: 942,919

[22] Filed: Dec. 22, 1986

Related U.S. Application Data

[63] Continuation of Ser. No. 524,632, Aug. 19, 1983, abandoned.

[30] Foreign Application Priority Data

Aug. 20, 1982 [JP] Japan .................................. 57-144167
Aug. 20, 1982 [JP] Japan .................................. 57-144168
Aug. 20, 1982 [JP] Japan .................................. 57-144170
Aug. 20, 1982 [JP] Japan .................................. 57-144171
Aug. 20, 1982 [JP] Japan .................................. 57-144172

[51] Int. Cl.$^4$ ............................................. G06F 3/00
[52] U.S. Cl. .................................... 364/900; 455/603; 358/903
[58] Field of Search ... 364/200 MS File, 900 MS File; 455/603; 358/903; 434/307

[56] References Cited

U.S. PATENT DOCUMENTS 4,425,586  1/1984  Miller ................................. 358/903
4,449,198  5/1984  Kroon et al. ......................... 364/900

FOREIGN PATENT DOCUMENTS 2449936 10/1980 France ................................. 434/307
0097967  6/1983 Japan .................................. 358/903

OTHER PUBLICATIONS

Motorola Catalog, Linear and Interface Integrated Circuits, pp. 7-2, 7-158-7-161.

Primary Examiner—Gareth D. Shaw
Assistant Examiner—Kevin A. Kriess
Attorney, Agent, or Firm—Sughrue, Mion, Zinn, Macpeak, and Seas

[57] ABSTRACT

An interface device is made connectable to a printer parallel port of a computer and contains a memory device addressed by print data received from the computer. The device further includes an apparatus for generating a remocon code to remote-control controlled equipment on the basis of the data addressed in the memory device and which sends said code to the controlled equipment.

5 Claims, 4 Drawing Figures

INTERFACE DEVICE

This is a continuation, of application Ser. No. 524,632, filed 8-19-83, now abandoned.

BACKGROUND OF THE INVENTION

Where computer equipment such as a general purpose personal computer (hereinafter abridged to PC) is used to remotely control electronic equipment such as a video disk player (hereinafter abridged to VDP) or a video tape player, an interface device desirably couples both devices, which differ in input/output conditions, and allows the computer to instruct each individual operation of the electronic equipment.

If a PC and a VDP, for example, are employed as the above-mentioned computer and electronic equipment, respectively, and if each individual operation of the VDP is instructed by the PC, it is possible to program-control the VDP using a memory included in the PC, and the applicable sphere of the VDP is favourably expandable to the fields of game and education. Therefore, several interface devices of this type have been marketed.

A PC operable as the computer is organized generally as shown in FIG. 1. In this drawing, symbol 1 is a central processing unit (CPU), 2 is a memory, 3 is a keyboard section, 4 is a printer interface (I/F), 5 is CRT I/F, 6 is an RS-232C I/F, 7 is a cassette I/F, and 8 is a system bus line mutually connecting the sections 1 to 7 and including an expandable input-output (I/O) port 8a. Printer I/F 4 has a printer parallel port 4a comprising eight-bit parallel data or control signal lines accommodated to the Centronics Standards, and CRT I/F 5 has a RGB output (component) 5a and a video output (composite) 5b. RS-232C I/F 6 is accommodated to a certain standard for serial transfer and has a serial port 6a which will be coupled via a coupler to a telephone network when the exchange of communications is desired with another PC through the telephone network. Further, cassette I/F 7 has a cassette input 7a and a cassette output 7b.

On the other hand, a VDP operable as the above-noted electronic equipment is constructed so that the individual operations of its VDP main section are switched by the manipulation of its VDP manipulator known as a remotely controlled (hereinafter abridged to remocon) commander. Thus, the VDP manipulator has a transmitter for selecting and transmitting remocon codes according to individual manipulations, and the VDP main section has a receiver for receiving the remocon code and for judging the contents of a command instruction of the former, respectively. The transmitter and receiver are composed of transmitting and receiving ICs forming a pair.

As described above, the PC does not have a standard port to connect a VDP as peripheral equipment, and the VDP is constructed so as to be remotely controlled by a certain remocon code. Therefore, in the case of coupling a PC and a VDP which differ in input/output conditions as described above, an interface device is needed.

A conventional VDP-PC interface device is constructed so that data transfer with the PC is effected through the serial port 6a of the RS-232C I/F 6 which transmits serial data and individual control signals from the PC. One example thereof is shown in FIG. 2. In this drawing, 9 is a parallel-serial decoder having an RS-232C serial port 9a, which alters serial data and individual control signals being input into port 9a from the PC into parallel data and sends the same to a CPU 10. CPU 10 decodes the input data on the basis of a program stored in a memory 11 and generates a remocon code receivable and discriminatable by the VDP. This remocon code is, after being current-amplified by an amplifier 12, sent out by driving an infrared-radiation diode 13a of a transmitter 13. A receiver of the VDP is used to receive this remocon code and control the individual operations thereof.

A conventional interface device of this type handles only signals for remote-controlling video equipment, thus, pictures represented by the video signals of the computer equipment and video equipment are displayed on CRT devices of the respective equipment.

Therefore, when a game or educational program was executed by the computer equipment, for instance, and if the pictures explaining the contents of the game or program were presented on the video equipment, a process input of the computer equipment was displayed on the video equipment, and the processed results were displayed on the computer equipment, the display was executed individually on two CRT devices, thus making viewing difficult.

As described above, the conventional interface device is constructed, in view of unified standards, so that the RS-232C serial port 6a of the PC is employed to output a remote code for the VDP. Thus, it is necessary to alter serial data into parallel data, resulting in a complicated construction and, inevitably, a high cost system. Further, some of the general purpose PCs currently sold in Japan are not provided with RS-232C ports and need external options to operate satisfactorily, resulting in further costs.

SUMMARY OF THE INVENTION

The present invention has been achieved in view of the foregoing drawbacks, and its object is to provide an interface device having a simplified construction, decreased cost and wide applicability.

It is another object of the present invention to provide an interface device which mutually couples computer equipment and video equipment and which offers wide applicability of the coupled equipment.

As described above, a PC is often not provided with an RS-232C port as is known in the art, but, most PCs possess a port for a printer and the operating system thereof is unified to a certain extent on the basis of the so-called Centronics Standards. Further, by using a given printer cable the connector arrangement at the printer site is unified, giving high applicability.

Considering the above, the present invention achieves interfacing via a printer port of the computer equipment and thereby widens the applicability of the interface device.

Further, because the output data type of the PC printer port is of the parallel eight bit type and its format is the ASCII (American Standard Code for Information Interchange) code or JIS code, the handling and processing of this type data are easier than that for RS-232C serial data, and thus, the construction of the interface device is simplified and its cost is lowered.

DETAILED DESCRIPTION OF THE INVENTION

Figure 1:
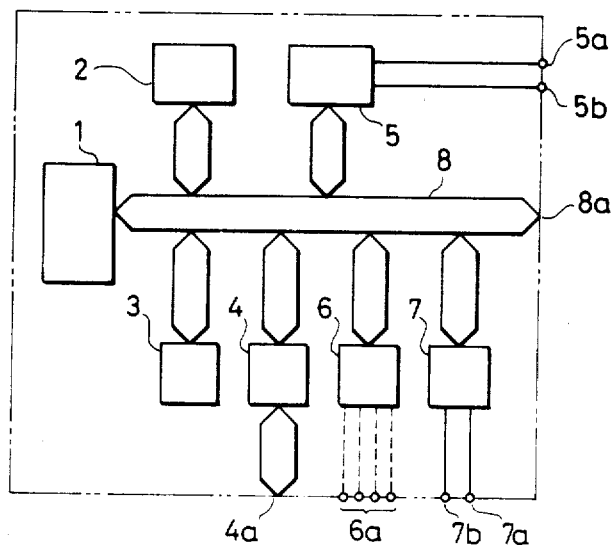
FIG. 1 is a block diagram showing an exemplary construction of a PC.
Figure 2:
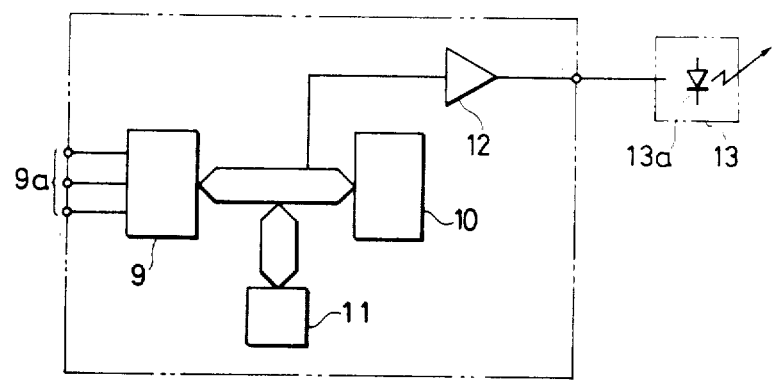
FIG. 2 is a block diagram showing an interface construction of the prior art.
Figure 3:
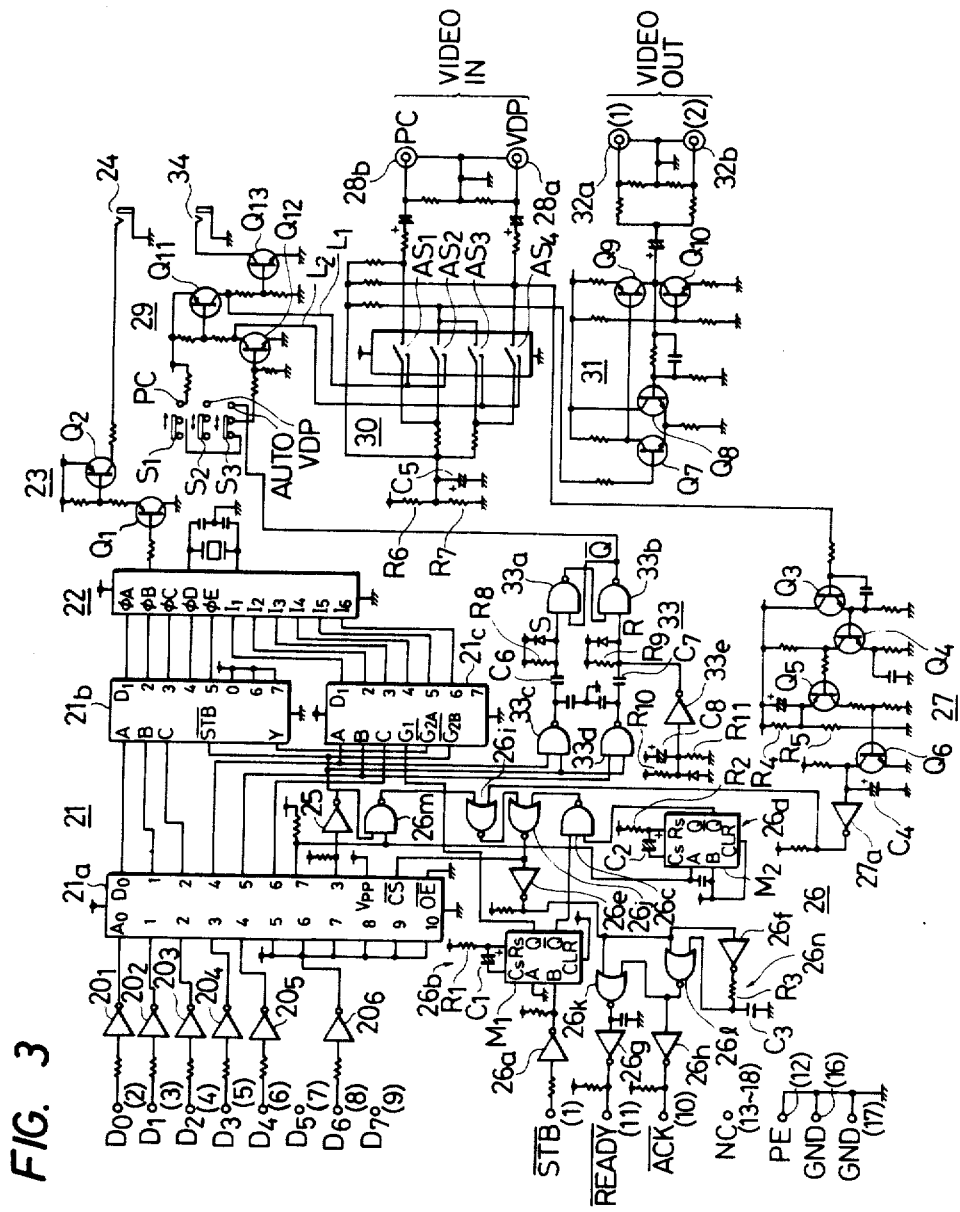
FIG. 3 is a block diagram showing an embodiment of the present invention.

FIG. 3 shows one embodiment of the present invention, as applied to a VDP-PC interface device.

One of the known VDPs employs a remote control device called a remocon commander to command-instruct individual operations of the VDP, which includes buttons for commands such as PLAY, PAUSE, STANDSTILL/FRAME FEED, SLOWMOTION, TRIPLE FAST, FAST FEED, FRAME DISPLAY, CHAPTER DISPLAY, NUMBER, SEARCH and the like. In the above, the command instruction has two different modes. One is a successive-pushing inhibit mode in which if one command instruction is successively repeatedly given, only the first given command is effective; that is, even when remocon command "1" button is pushed repeatedly, the occurrence of "1" "1" "1" ... being carried out is inhibited. The other mode is a successive-pushing effect mode in which when one command instruction is repeatedly given, all of the given commands become effective; that is, this mode allows successive execution of the operation represented by a pushed button while it is pushed, such as in the fast feed or scan operation.

Therefore, according to this embodiment of the interface device, the timing of generating a control signal for controlling receipt of a command instruction from the PC is made variable automatically depending upon the contents of the command instruction.

Most of the PCs sold on the market are programmable by a high level language such as "BASIC", and produce a print order to a printer by a simple manipulation. Therefore, the interface device shown in the drawing is constructed so that individual operations of the VDP are command-instructed by the print order.

Most of the printer parallel ports of PCs are based upon the Centronics Standards (the firm standards of the Centronics Company, U.S.A.). That is, they have 36 input/output lines numbered from 1st to 36th in which the 2nd through 9th lines are assigned as eight-bit parallel bus lines for printing. 1st, 10th and 11th lines are assigned, respectively, as a $\overline{STB}$ ($\overline{STROBE}$) signal line, a $\overline{READY}$ (or $\overline{BUSY}$) signal line, and an $\overline{ACK}$ ($\overline{AC\ KNOWLEDGE}$) signal line, which signals are control signals relating to the sending of print data (hereinafter the upper bar " " is omitted). 12th, 16th and 17th lines are assigned, respectively, as PE, GND and GND. The foregoing ACK signal is ignored by some PCs, and the sending/receiving of data is made possible using only the STB and READY signals. The remaining lines are used to inform of equipment abnormalities, and it is sufficient if the foregoing three control signals (with GND) give a certain response for each data. Thus, the other signals are sufficient if they are set to a certain state.

Specifically, where the distinction between a capital letter and a small letter of the alphabet is not needed, the 7th line corresponding to the 6th data line is not required; further, in the case where most of the characters do not need a print order, the 9th line corresponding to the most significant bit data line is not needed.

Considering the foregoing, the device of the present invention, giving command instructions for individual VDP operations, but requiring no print order for most characters and no distinction between capital and small letters, is provided with terminals corresponding to $D_0$ through $D_4$ and $D_6$ out of the eight-bit parallel bus lines $D_0$ through $D_7$; STB, READY and ACK lines; and PE and GND lines, as shown in FIG. 3.

The foregoing bus line terminals $D_0$ through $D_4$ and $D_6$ are connected, respectively, to address bus lines $A_0$ through $A_4$ and $A_6$ of a ROM IC 21a, for example, a catalogue No. 2716, via inverters $20_1$ through $20_6$, and are constructed so that the address of the ROM IC 21 is designated by the print data from the PC. Data in the designated address of ROM IC 21a is formed of eight bits and is sent out from data bus lines $D_0$ through $D_7$. ROM IC 21a is provided further with H-level address bus lines $A_5$ and $A_7$ through $A_{10}$ and terminal $V_{pp}$, L-level terminal $\overline{OE}$, and chip selection terminal $\overline{CS}$ (hereinafter the upper bars " " are omitted) which places ROM IC 21a in an active state in response to an L-level input.

ROM IC 21a forms a code converter means 21 together with BCD-decimal decoders 21b and 21c made of catalogue Nos. LS151 and LS138 ICs. If the print order is executed in the PC, code converter means 21 converts its print data to certain data and sends the same to a remocon transmitting IC 22 made of catalogue No. M50110CP, for instance. Remocon transmitting IC 22 selectively generates a remocon code on the basis of the data obtained by code converter means 21. The remocon code signal generated by remocon transmitting IC 22 is current-amplified by an amplifier 23 made of transistors $Q_1$ and $Q_2$ and sent, through a command output pin jack 24, to an infrared ray transmitter (not shown), for instance.

Less significant bit data bus lines $D_0$ through $D_2$ of ROM IC 21a are connected to inputs A through C of BCD-decimal decoder 21b, more significant bit data bus lines $D_4$ through $D_6$ are connected to inputs A through C of BCD-decimal decoder 21c, and data bus line $D_3$ is connected through inverter 25 to the STB input of decoder 21b and the $G_{2B}$ input (hereinafter the upper bar is omitted) of decoder 21c. The most significant bit data bus line $D_7$ will be used as described hereinafter, for a given day and time. Further, the Y terminal of BCD-decimal decoder 21b and the $G_{2A}$ input (hereinafter the upper bar is omitted) of decoder 21c are mutually connected.

BCD-decimal decoder 21b assumes the active state if the STB input is at the L-level, and BCD-decimal decoder 21c assumes the enabled state if the $G_{2A}$ input and the $G_{2B}$ input are both at the L level and the $G_1$ input is at the H-level. Each of the BCD-decimal decoders 21b and 21c has eight bit parallel data bus lines $D_1$ through $D_7$, lines $D_1$ through $D_5$ of decoder 21b being connected to scan output lines $\phi A$ through $\phi E$ of remocon transmitting IC 22, and lines $D_1$ through $D_6$ of decoder 21c being connected to key input lines $I_1$ through $I_6$, respectively.

Figure 4:
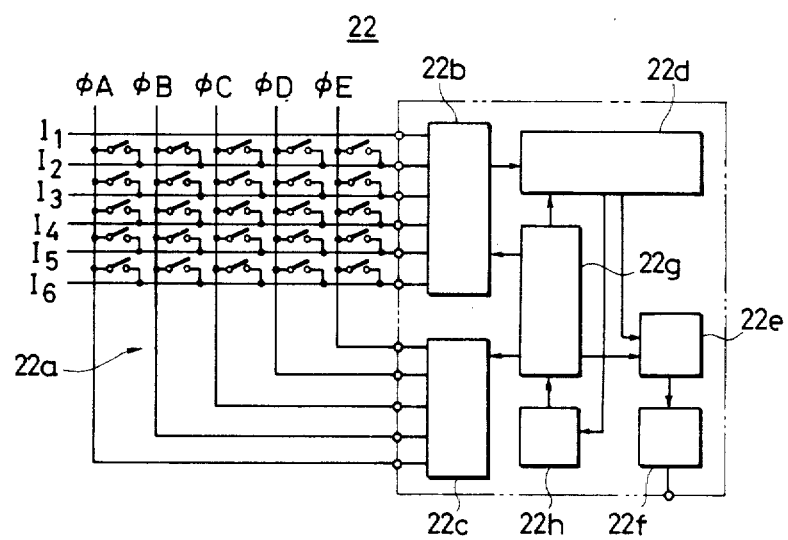
FIG. 4 is a block diagram showing a portion of FIG. 3 in detail.

Remocon transmitting IC 22 is constructed as shown in FIG. 4. That is, the arrangement has a key matrix 22a in which switches are distributed at respective crossed points between scan output lines $\phi A$ through $\phi E$ and key input lines $I_1$ through $I_6$. Key input lines $I_1$ through $I_6$ are connected to a key input encoder 22b, and scan output lines A through E are connected to a scan signal generator circuit 22c. Because scan signal generator circuit 22c generates a scan pulse successively on its output lines $\phi A$ through $\phi E$, key input encoder 22b can discriminate one of thirty switches in key matrix 22a which are made on or off by data bus lines $D_1$ through $D_5$ and $D_1$ through $D_6$ of decoders 21b and 21c in response to signals from key input lines $I_1$ through $I_6$.

Then, signals obtained by key input encoder 22b are input into order decoder 22d where contents of the command instruction sent out from the PC as the print order are discriminated. The discrimination results are added to a code modulation circuit 22d in which a command code is generated and output via a buffer 22f. Box 22g is a timing generator circuit which achieves timing action between 22b and 22c on the basis of the clock pulse from a clock generator 22h which is controlled by a signal from the order decoder 22d.

The STB signal received from the PC together with the print data is added to the B input of a positive trigger type retriggerable mono multivibrator $M_1$ via inverter 26a. This retriggerable mono multivibrator $M_1$ forms a first timer 26b having a time constant $C_1R_1$ owing to condenser $C_1$ and resistor $R_1$, its Q output being connected to input $G_1$ of BCD-decimal decoder 21c and its $\overline{Q}$ output being connected to one input of NAND gate 26c.

Inverter 26a, timer 26b and NAND gate 26c form a portion of timing circuit 26 which receives the STB signal from the STB input and the like and sends out the READY signal, the ACK signal and the like.

Timing circuit 26 includes a retriggerable mono multivibrator $M_2$ and the second timer 26d formed by a condenser $C_2$ and resistor $R_2$, the time constant $C_2R_2$ of timer 26d being set to be about twice the value $C_1R_1$ of first timer 26b. Retriggerable mono multivibrator $M_2$ is connected at its A input to the most significant bit bus line $D_7$ of ROM IC 21a, thus, it is negative-triggered by a signal falling to the L-level at bus line $D_7$, and the $\overline{Q}$ output is held at the L-level for an interval corresponding to time constant $C_2R_2$.

Timing circuit 26 further includes inverters 26e through 26h, NOR gates 26i through 26l, NAND gate 26m, and an integration circuit 26n formed by condenser $C_3$ and resistor $R_3$. One input of NAND circuit 26m is connected to the output of inverter 25 and the other input is connected to the bus line $D_7$ of ROM IC 21a. The output of NAND circuit 26m is connected to one input of the NOR gate 26i, the other input of which is connected to an output of a video detection circuit 27 noted hereinafter. The output of NOR gate 26i is connected to one input of NOR gate 26j, the other input of which is connected to the output of NAND gate 26c. One input of NAND gate 26c is connected to the $\overline{Q}$ output of retriggerable mono multivibrator $M_1$ as noted above, and its other input is connected to the $\overline{Q}$ output of retriggerable mono multivibrator $M_2$.

The output of NOR gate 26j is connected to the CS input of ROM IC 21a, and, through inverter 26e, to one input of each of NOR gates 26l and 26k and, further through inverter 26f and integration circuit 26n, to the other input of NOR gate 26l. The output of NOR gate 26l is connected to the other input of NOR gate 26k and through inverter 26h to the ACK terminal, and the output of NOR gate 26k is connected through inverter 26g to the READY terminal.

The video detection circuit 27 comprises an emitter follower buffer formed by transistor $Q_3$, an inverter amplifier formed by transistor $Q_4$, a comparator formed by transistor $Q_5$ which compares the output level of the inverter amplifier with a reference voltage determined by resistors $R_4$ and $R_5$, a switch circuit formed by transistor $Q_6$ which opens or closes the discharge path of condenser $C_4$ in response to the output of the comparator, and an inverter 27a for inverting the charging level of condenser $C_4$. The device is constructed so that when no video signal is input to the base of transistor $Q_3$, the output of inverter 27a has an L-level, and if there is a video signal, the inverter output is at the H-level. To the input of video detection circuit 27, a VDP video input terminal 28a is connected which will receive the video signal of the VDP.

VDP video input terminal 28a forms a video input terminal pair with video input terminal 28b, which will receive a video signal from the PC. The video signal being input into video input terminals 28a and 28b is sent, through switch circuit 30 controlled by PC-VDP selection circuit 29, either video signal at a time, to a video amplifier 31 formed by transistors $Q_7$ through $Q_{10}$, and, after amplified, to a video display means or CRT device (not shown) via video output terminals 32a and 32b. Because two video output terminals 32a and 32b are provided, a picture represented by one video signal can be displayed simultaneously on two CRTs.

PC-VDP video selection circuit 29 includes three manual switches $S_1$ through $S_3$ which are normally in the position shown in the drawing. Each switch is locked in the moved position if it is shifted right-wards, and the locked state of one moved switch is released by right-ward manipulation of another switch, and the released switch returns to the position shown. Switch $S_1$ is for PC video selection, $S_2$ is for VDP video selection, and $S_3$ is for automatic selection where PC or VDP video is automatically selected. PC-VDP video selection circuit 29 further includes transistors $Q_{11}$ and $Q_{12}$. When PC video selection switch $S_1$ is manipulated, transistors $Q_{11}$ and $Q_{12}$ turn on and output signal lines $L_1$ and $L_2$ have H and L levels, respectively. When switch $S_2$ is manipulated, transistors $Q_{11}$ and $Q_{12}$ turn off and output signal lines $L_1$ and $L_2$ have L and H levels, respectively. When switch $S_3$ is manipulated, transistors $Q_{11}$ and $Q_{12}$ are turned on or off in response to the output level of a latch circuit 33 hereinafter described. That is, when the output of latch circuit 33 has the H-level, transistors $Q_{11}$ and $Q_{12}$ both turn on and exhibit the same state as when PC switch $S_1$ is manipulated and, contrarily, when the output of latch circuit 33 is at the L level, transistors $Q_{11}$ and $Q_{12}$ both turn off and exhibit the same state as when VDP switch $S_2$ is manipulated.

Output signal lines $L_1$ and $L_2$ function as control lines for relays or analogue switches $AS_1$ and $AS_2$ or $AS_3$ and $AS_4$ forming switch circuit 30. If the line level is at the H level switches $AS_1$ through $AS_4$ turn on and if it is L they turn off. When transistors $Q_{11}$ and $Q_{12}$ are on as when PC switch $S_1$ is manipulated, analogue switches $AS_1$ and $AS_2$ are switched on and the PC video signal being input into PC video input terminal 28b is sent from video output terminals 32a and 32b to a CRT device, through analogue switches $AS_1$ and $AS_2$ and video amplifier 31. On the other hand, when transistors $Q_{11}$ and $Q_{12}$ are off as when VDP switch $S_2$ is manipulated, analogue switches $AS_3$ and $AS_4$ are switched on and the VDP video signal being input into VDP video input terminal 28a is sent from video output terminals 32a and 32b to a CRT device, through analogue switches $AS_4$ and $AS_3$ and video amplifier 31.

To switch circuit 30, a DC level setting circuit is added which is formed by resistors $R_6$ and $R_7$ and condenser $C_5$, to set a DC level of the video signal.

Latch circuit 33 includes an R-S flip-flop formed by NAND gates 33a and 33b, R and S inputs of this flip-flop being connected, respectively, through differentiation circuits formed by resistor $R_8$ and condenser $C_6$ and by resistor $R_9$ and condenser $C_7$, to the outputs of NAND gates 33c and 33d. NAND gate 33c is connected at one input to bus line $D_4$ of ROM IC 21a and at the other input to the output of inverter 25. NAND gate 33d is connected at one input to bus line $D_5$ of ROM IC 21a and at the other input to the output of inverter 25.

Accordingly, when both inputs to NAND gates 33c or 33d become H, their output becomes L, the flip-flop is set/reset by a negative pulse generated in the differentiation circuit in response to the former, and its $\bar{Q}$ output is switched.

To latch circuit 33 another circuit is added, which includes resistors $R_{10}$ and $R_{11}$, condenser $C_8$ and inverter 33e and which functions to reset the flip-flop to alter its output to the H level when a power source switch is closed. Therefore, if the device is in the automatic selection state by means of switch $S_3$, in response to the closure of a power source switch, the PC video signal is selected.

Because transistor $Q_{13}$ connected to video selection circuit 29 turns on/off in response to video signal selection, its output will be used to switch between PC sound and VDP sound by taking the same from pin jack 34.

In the foregoing construction, the data bus line $D_7$ of ROM IC 21a assumes the L-level except when the command instruction from the PC is for fast feed or scan, and data bus line $D_3$ assumes the H-level when the generation of a remocon code is not needed or when the instruction is not related to video detection, video signal selection and the like. Further, the memory contents of ROM IC 21a addressed by print data corresponding to individual instructions will be predetermined so that data bus lines $D_4$ and $D_5$ both take the L level if there is a video detection instruction, take L and H levels, respectively, if there is a PC video selection instruction, and take H and L levels, respectively, if there is a VDP video selection instruction.

In the following, the operations relating to individual instruction will be described.

(1) Remocon instruction except for fast feed and scan;

This instruction group includes the play instruction, frame number designation instruction and the like.

The STB terminal or the input from the PC to timing circuit 26 is normally kept at the H level. $D_3$ and $D_7$ of ROM IC 21a are both at the H level in the non-active state. Further, the first and second timers 26b and 26d both have $\bar{Q}$ outputs at a H level in the non-triggered initial state. Therefore, the output of NAND gate 26c is H, the output of NAND gate 26m is H, the output of NOR gate 26i is L, and both inputs of NOR gate 26j are at L so as to produce the H-level at its output. Thus, one input of NOR gates 26k and 26l becomes L and the other input of NOR gate 26l becomes H, so that the output of the NOR gate 26l becomes L and the output of NOR gate 26k becomes H. Accordingly, the READY terminal and the ACK terminal are normally at the L and H levels, respectively.

In the above state, if the first mentioned instruction is received from the PC as print data together with the STB signal, the first timer 26b is triggered by the STB signal and its outputs, i.e., Q and $\bar{Q}$ output, are inverted from L and H to H and L, respectively. Because the $\bar{Q}$ output of second timer 26d is at H at this moment, the output of NAND gate 26c changes from L to H and, as a result, the output of the NOR gate 26j becomes L. This L level output of NOR gate 26j changes ROM IC 21a to the active state.

In response to the above, the contents of ROM IC 26a addressed by the print data are sent to data buses $D_0$ through $D_7$. Because the transmitted data level is H at $D_3$ and L at $D_7$ at this time, the second timer 26d is triggered and its $\bar{Q}$ output is inverted from H to L. Further, because $D_3$ is at H, the STB input and $G_{2B}$ input of BCD-decimal decoders 21b and 21c respectively become L, BCD-decimal decoder 21b assumes the active state, and any one of the scan outputs $\phi A$ through $\phi E$ of remocon transmitting IC 22, which are input into $D_1$ through $D_5$ of decoder 21b, may be selected in accordance with the states of the A, B and C terminals of BCD-decimal decoder 21b and output at the Y terminal. The scan pulse at $\phi A$ through $\phi E$ of remocon transmitting IC 22 is a negative pulse, the Y terminal output becomes a negative pulse, and $G_{2A}$ of BCD-decimal decoder 21c has the L level while pulses are generated, and thus, this decoder is in the active state. While BCD-decimal decoder 21c is in the active state, any one of $D_1$ through $D_7$ may become the L level depending upon the states of the A, B and C terminals. Therefore, the result of circuit operation caused by the state of the A, B and C terminals of BCD-decimal decoders 21b and 21c is equivalent to connection between any one of $\phi A$ through $\phi E$ of remocon transmitting IC 22 and any one of $I_1$ through $I_6$. Then, on the basis of the signal obtained by this transformation, remocon transmitting IC 22 is caused to generate a remote control signal corresponding to the given instruction.

As described above, by the change of the output of NOR gate 26j to the L-level, the output of NOR gate 26k becomes L and thereby the READY terminal rises to H. Also, by $D_7$ becoming L, the second timer 26d is triggered and its $\bar{Q}$ output changes from H to L, but, the output of NAND gate 26c does not change.

After a sufficient time has passed to transmit and terminate a remocon code, first timer 26b changes to the initial state and the $\bar{Q}$ output changes from L to H, but the second timer 26d still has its Q output in the L state; thus, the output of NAND gate 26c does not change and READY and ACK terminals are held at H.

After another similar interval has passed, the second timer 26d changes back to the initial state and its Q output goes from L to H, thus, the output of NAND gate 26c changes to L. Because the output of NOR gate 26j is at L at this moment, the output of NOR gate 26j becomes H and, thereby, the ROM IC 26a is caused to change to the non-active state. Also, in response to the above, the output of inverter 26e becomes L and the output of NOR gate 26l becomes H; as a result, the ACK terminal becomes L. Afterward, when condenser $C_3$ is charged to a sufficient level, the output of NOR gate 26l becomes L and the ACK terminal becomes H again. The time interval during when the ACK terminal is at L is determined by $C_3R_3$. Due to the change of the output of NOR gate 26l to the L-level, the output of NOR gate 26k becomes H and, as a result, the READY terminal becomes L and the receipt of the next data is allowed. Then, the next data is sent from the PC together with the STB signal.

(2) Fast feed or scan instruction:

When an instruction of the above type is sent from the PC, the first timer 26b is triggered as in the case above, the Q output changes from L to H, the $\overline{Q}$ output changes from H to L, the output of NOR gate 26j becomes L, and, thus, ROM IC 21a is placed in the active state.

In the case of the above instructions both $D_3$ and $D_7$ become H, and thus, the second timer 26d is not triggered. Therefore, when a time related to $C_1R_1$ has passed and the output of timer 26b changes to the initial state, the output of the NAND gate 26c goes from H to L and the output of NOR gate 26j becomes H, so that the ROM IC 21a is made non-active. Then, the output of inverter 26e becomes L, and, thereby, the output of the NOR gate 26l becomes H, and thus, the ACK terminal becomes L. The time interval during which the terminal is L depends upon $C_3R_3$ and, contrarily, the READY terminal then becomes L. When the READY terminal becomes L, the receipt of the next data signal from the PC is allowed.

In this way, in the case of the fast feed or scan instruction, it is possible to receive the same instruction successively or repeatedly within a short time interval, and to thus send fast feed or scan instructions to the VDP continuously.

On the contrary, in the case of instructions except for the fast feed and scan instructions, only one instruction is received from the PC per a relatively long time interval, and thus, even in the case of frame designation with a series of the same number, the repeated sending of one number to the VDP main section does not occur, thereby eliminating the occurrence of false operation.

(3) Video detection instruction:

This instruction is, when the VDP is altered from the standstill state to the play state or when the searching of a designated frame or chapter is executed, used to detect the start of the play operation or the end of the search, from the video signal received from the VDP.

When this instruction is sent from the PC, the first timer 26b is triggered by the STB signal and, thereby, the ROM IC 21a is switched to the active state. Then, by the READY terminal becoming H, the receipt of the next instruction is inhibited.

In this case, as described above, the ROM IC 21a outputs data which results in $D_3$ through $D_5$ being L and $D_7$ being H, and thus, the output of NAND gate 26m becomes L. Therefore, if a video signal is not input into video input terminal 28a from the VDP and if the output of the video detection circuit 27 is at L, the output of NOR gate 26i is at H. So, even if first the timer 26b returns to its initial state, the output of NOR gate 26j does not change and stays at L, and the ROM IC 21a is held in the active state.

Then, if a video signal is input from the VDP and is detected by video detection circuit 27, developing an H at its output, the output of NOR gate 26i becomes L, and, thereby, the output of NOR gate 26j becomes H. Thus, the ROM IC 21a assumes the non-active state. The output of inverter 26e then becomes H, and, thereby, the ACK terminal generates an L-level signal for a certain interval, the end of instruction execution is informed to the PC, the ACK terminal becomes H and, at the same time, the READY terminal becomes L. Thus, the PC is informed that the next data can be received.

(4) Video signal selection instruction:

In this case, switch $S_3$ is manipulated to the automatic state.

In the case of a PC video signal selection instruction, when the ROM IC 21a becomes active, data is output with $D_3$ and $D_4$ being L and $D_5$ being H, whereby the output of NAND gate 33d is lowered from H to L. This change is differentiated by the differentiation circuit, and the flip-flop formed by NAND gates 33a and 33b is reset. Then, the output of latch circuit 33 becomes H, both transistors $Q_{11}$ and $Q_{12}$ of video selection circuit 29 turn on, and signal lines $L_1$ and $L_2$ become H and L, respectively. Thus, analogue switches $AS_1$ and $AS_2$ are switched on, a PC video signal from terminal 28b is led, through amplifier 31, to video output terminals 32a and 32b, and, then, the picture from the PC is displayed on a CRT device connected to these terminals.

In the case of a VDP video signal selection instruction, $D_3$ and $D_5$ become L and $D_4$ becomes H. The output of latch circuit 33 becomes L, signal line $L_2$ becomes H and signal line $L_1$ becomes L, thus, analogue switches $AS_3$ and $AS_4$ turn on, thereby a video signal from terminal 28a is, through amplifier 31 and terminals 32a and 32b, led to a CRT device.

As described above, the present invention provides an interface device, employable between a computer and an electronic device, utilizing a printer parallel port of the computer which has wide applicability. Thus, the novel interface device affords wide applicability and easy data processing, and can generate a remocon code with a simple construction. Further, a print order from the computer is usable as data, offering simplified control.

Further, the present device employs a memory device addressable by print data and generates a remocon code on the basis of data in the memory device being addressed. Thus, a command instruction for operation of the electronic equipment is input in the form of print data. In addition, the alteration of the remocon code can be dealt with easily by rewriting the contents of the memory device.

What is claimed is:

1. In an electronic system including a computer having at least an input port and an output port, said computer outputting print data, which is in format for printing, in parallel format through said output port, and a remotely-controllable device which is operable in accordance with a plurality of remocon codes; an interface device comprising:

a plurality of bus line terminals for transmitting said print data having more significant digits and less significant digits, a first set of said bus line terminals transmitting said more significant digits and a second set of said bus line terminals transmitting said less significant digits;

code converter means for converting said print data to output data, said code converter means comprising in turn:

a read-only memory connected to said bus line terminals;

first BCD-decimal decoder having 8 bit parallel data bus lines, for receiving said more significant digits from said data bus lines; and a second BCD-decimal decoder having 8 bit parallel data bus lines, for receiving said more significant digits from said data bus lines;

a remocon transmitting integrated circuit for receiving said output data from said code converter means and outputting a remocon code signal in accordance with said output data;

amplifier means connected to said remocon transmitting integrated circuit for amplifying said remocon code signal;

a timing circuit, including a first timer having a first time constant, and a second timer having a second time constant that is twice as long as said first time constant; and a video detection circuit for detecting a video signal in accordance with an output of said timing circuit.

2. An interface device as claimed in claim 1, wherein said timing circuit includes means for varying timing of said control signal in accordance with said portion of said print data.

3. An interface device as claimed in claim 1, wherein said remotely-controllable device is a video device, said electronic system including video display means, said interface device further comprising:

a pair of video input terminals for receiving respective video signals from said computer and said video device;

a video output terminal connectable to said video display means; and switching means, positioned between said pair of video input terminals and said video output terminal, for connecting either one of said video input terminals to said video output terminal.

4. An interface device as claimed in claim 2, wherein said remocon code generating means includes means for generating at least first and second remocon codes in accordance with said portion of said print data, print data corresponding to said first remocon code effecting shorter timing circuit control signal generation delay times than said print data corresponding to said second remocon code.

5. An interface device as claimed in claim 3, further comprising controlling means for effecting manual and automatic control of said switching means.

* * * * *